US010329497B2

(12) United States Patent
Gabrielov et al.

(10) Patent No.: US 10,329,497 B2
(45) Date of Patent: *Jun. 25, 2019

(54) METHOD OF MAKING A HYDROPROCESSING CATALYST WITH A SINGLE STEP METAL AND CHELANT INCORPORATION, THE CATALYST, AND THE USE OF THE CATALYST

(71) Applicant: SHELL OIL COMPANY, Houston, TX (US)

(72) Inventors: Alexei Grigorievich Gabrielov, Houston, TX (US); Ed Ganja, The Woodlands, TX (US); Salvatore Philip Torrisi, The Woodlands, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/164,488

(22) Filed: May 25, 2016

(65) Prior Publication Data

US 2016/0289572 A1 Oct. 6, 2016

Related U.S. Application Data

(62) Division of application No. 13/208,181, filed on Aug. 11, 2011, now Pat. No. 9,376,637.

(60) Provisional application No. 61/373,457, filed on Aug. 13, 2010.

(51) Int. Cl.
*B01J 31/26* (2006.01)
*B01J 31/38* (2006.01)
*B01J 35/10* (2006.01)
*C10G 45/08* (2006.01)
*C10G 45/12* (2006.01)
*B01J 37/20* (2006.01)
*B01J 23/85* (2006.01)
*B01J 37/02* (2006.01)
*B01J 27/188* (2006.01)

(52) U.S. Cl.
CPC ............. *C10G 45/08* (2013.01); *B01J 23/85* (2013.01); *B01J 31/26* (2013.01); *B01J 31/38* (2013.01); *B01J 35/1014* (2013.01); *B01J 35/1019* (2013.01); *B01J 35/1042* (2013.01); *B01J 35/1066* (2013.01); *B01J 37/0203* (2013.01); *B01J 37/20* (2013.01); *C10G 45/12* (2013.01); *B01J 27/188* (2013.01); *B01J 35/1061* (2013.01); *C10G 2300/1048* (2013.01); *C10G 2300/1077* (2013.01); *C10G 2300/202* (2013.01); *C10G 2400/04* (2013.01)

(58) Field of Classification Search
None
See application file for complete search history.

(56) References Cited

U.S. PATENT DOCUMENTS

| | | | |
|---|---|---|---|
| 7,235,173 B2 | 6/2007 | Diehl et al. | |
| 7,696,120 B2 | 4/2010 | Ginestra et al. | |
| 8,236,723 B2 | 8/2012 | Timmer et al. | |
| 8,262,905 B2 | 9/2012 | Gabrielov | |
| 8,877,671 B2 | 11/2014 | Radiowski et al. | |
| 9,211,536 B2 | 12/2015 | Gabrielov et al. | |
| 2004/0050754 A1 | 3/2004 | Abe et al. | |
| 2005/0159296 A1 | 7/2005 | Ginestra et al. | |
| 2006/0166809 A1 | 7/2006 | Malek et al. | |
| 2009/0038993 A1* | 2/2009 | Gabrielov | B01J 23/85 208/243 |
| 2009/0298677 A1 | 12/2009 | Radlowski et al. | |
| 2010/0236988 A1 | 9/2010 | Gabrielov et al. | |
| 2012/0205292 A1 | 8/2012 | Gabrielov et al. | |

FOREIGN PATENT DOCUMENTS

| | | |
|---|---|---|
| CN | 1717278 | 1/2006 |
| CN | 1921942 A | 2/2007 |
| CN | 101330972 | 12/2008 |
| JP | 2009519815 A | 5/2009 |
| JP | 2009523596 A | 6/2009 |
| JP | 2013535330 | 9/2013 |
| JP | 2013538120 | 10/2013 |
| JP | 5805761 | 11/2015 |
| JP | 5805762 | 11/2015 |
| WO | 2007084439 | 7/2007 |
| WO | 2009126319 | 10/2009 |
| WO | WO2012021389 | 2/2012 |

OTHER PUBLICATIONS

Delley B., "An All-Electron Numerical Method for Solving the Local Density Functional for Polyatomic Molecules", J. Chem. Phys., 92, pp. 508-517, 1990.
Hohenberg P. et al., "Inhomogeneous Electron Gas", Phys. Rev. B, vol. 136, No. 3B, 1964, pp. 864-871.

(Continued)

*Primary Examiner* — Colin W. Slifka
(74) *Attorney, Agent, or Firm* — Charles W. Stewart

(57) ABSTRACT

A hydroprocessing catalyst composition that comprises a metal-incorporated support having incorporated therein a metal component and a chelating agent, and, further comprising a polar additive. The catalyst composition is prepared by incorporating in a single step at least one metal component and a chelating agent into a support material to form a metal-incorporated support followed by drying the metal-incorporated support and thereafter incorporating therein a polar additive.

6 Claims, No Drawings

(56) References Cited

OTHER PUBLICATIONS

Levy M., "Universal Variational Functionals of Electron Densities, First-Order Density Matrices, and Natural Spin-Orbitals and Solution of the V-Representability Problem", Proc. Natl. Acad. Sci., USA, vol. 76, pp. 6062-6065, 1979.
Roothaan, C. C. J., "New Developments in Molecular Orbital Theory", Dept. of Physics, Univ. of Chicago, Rev. Mod. Phys., vol. 23, No. 2, pp., 69-89, 1951.
Slater, J. C., "Statistical Exchange-Correlation in the Self-Consistent Field", Quantum Theory Project, Univ. of Florida, Adv. Quantum Chem., vol. 6, pp. 1-92, 1972.
Dewar, M. J. S., "Development and Status of MINDO/3 and MNDO", Dept. of Chemistry, Univ. of Texas, J. Mol. Struct., vol. 100, pp. 41-50, 1983.
Hedin L. et al., "Explicit Local Exchange Correlation Potentials", J. Phys. C: Solid St. Phys., vol. 4, pp. 2064-2083, 1971.
Ceperley, D. M. et al, "Ground State of the Electron Gas by a Stochastic Method", Lawrence Livermore Laboratory, Univ. of California, Phys. Rev. Letters., vol. 45, No. 7, pp. 566-569, 1980.
Perdew, J. P. et al., "Accurate and Simple Analytic Representation of the Electron-Gas Correlation Energy", Dept. of Physics & Quantum Theory Group, Tulane Univerisity, Phys. Rev. B, vol. 45, 13 244-13 249, 1992.

\* cited by examiner

METHOD OF MAKING A HYDROPROCESSING CATALYST WITH A SINGLE STEP METAL AND CHELANT INCORPORATION, THE CATALYST, AND THE USE OF THE CATALYST

CROSS-REFERENCE TO RELATED APPLICATIONS

This application is a divisional application of U.S. Non-Provisional application Ser. No. 13/208,181 filed Aug. 11, 2011, issued Jun. 8, 2016 as U.S. Pat. No. 9,376,637, which claims the benefit of U.S. Provisional Application No. 61/373,457, filed Aug. 13, 2010, the disclosures of which are hereby incorporated by reference.

FIELD OF THE INVENTION

The invention relates to a hydroprocessing catalyst composition that includes a metal-containing support having incorporated therein a metal component and a chelant and further loaded with a polar additive and a method of making and use of such a catalyst.

BACKGROUND OF THE INVENTION

With the increasingly more stringent requirements for reducing the levels of sulfur and nitrogen contained in petroleum derived hydrocarbon product streams there has been an ongoing effort to find new or improved hydroprocessing catalyst formulations and products that may suitably be used to more economically provide for the required sulfur and nitrogen reductions in the hydroprocessing of such petroleum derived hydrocarbon streams.

Typical hydroprocessing catalysts known in the art can include a Group VI metal (Mo and/or W) and a Group VIII (Co and/or Ni) as active components which are supported on an inorganic oxide support material. These catalyst components may be combined and treated in a many different ways to give catalyst compositions having certain desired properties.

One example of a hydrotreating catalyst proposed for use in the hydrodesulfurization, hydrodenitrogenation, and hydrodemetallization of various petroleum fractions is disclosed in U.S. Pat. No. 7,235,173. This patent discloses a hydrotreating catalyst containing a group VIB and/or a group VIII with an organic compound as an additive. The organic additive is a compound that contains at least one nitrogen atom and corresponds to a specifically defined generic formula. The catalyst of the '173 patent is prepared by incorporating the hydrogenation metals into a matrix material, such as by ion exchange or dry impregnation of the substrate followed by a calcination. The organic compound may be introduced into the catalyst composition by dry impregnation or by co-impregnation simultaneously with the metals or it may be present in the sulfurization feedstock. The '173 patent indicates that its catalysts that employ the particular organic additive exhibit improved activity over the comparative catalysts that do not employ an additive.

In U.S. Publication US 2009/0298677 is disclosed a hydroprocessing catalyst that includes a carrier containing catalytically active metals from Group VIB and Group VIII of the periodic table and a chelating compound. The chelating agents that are suitable for use in the hydroprocessing catalyst are preferably hydroxycarboxylic acid, especially those that contain one or more carboxyl groups and one or more hydroxyl groups. One preferred chelating agent is citric acid. The hydroprocessing catalyst is prepared by contacting a carrier with an impregnation solution of catalytically active metals and a chelating agent followed by heating the impregnated carrier to provide a catalyst having a loss on ignition that is within a desired range. The heating temperature is to be less than a temperature that would result in significant or substantial degradation of the organic chelating agent.

As is indicated in these patents, there is an ongoing need to find new and improved hydroprocessing catalyst compositions that have improved catalytic properties. There is a need to find hydrotreating catalyst compositions that are highly active and stable when used in the treatment of petroleum derived hydrocarbon process streams that have high concentrations of sulfur and nitrogen.

BRIEF SUMMARY OF THE INVENTION

Accordingly, provided is a hydroprocessing catalyst composition that may be used in the hydroprocessing of hydrocarbon feedstocks to yield a hydrotreated hydrocarbon product. The hydroprocessing catalyst composition comprises a metal-incorporated support having incorporated therein a metal component and a chelating agent, which further comprises a polar additive. The inventive composition may be made by a method of making a composition, wherein the method comprises: providing a shaped support; incorporating a solution, comprising a metal component and a chelating agent, into the shaped support to provide a metal-incorporated support; drying the metal-incorporated support so as to provide a dried metal-incorporated support having a volatiles content in the range of from 1 to 20 wt % LOI; and incorporating a polar additive into the dried metal-incorporated support to thereby provide an additive impregnated composition.

DETAILED DESCRIPTION OF THE INVENTION

The composition of the invention is particularly useful in applications involving the catalytic hydroprocessing of petroleum derived feedstocks, such as in the hydrotreating of atmospheric distillates, gas oils and residues and of vacuum gas oils and residues. One embodiment of the catalyst composition of the invention comprises a shaped support that has incorporated therein, using a single step impregnation, a solution of at least one metal component that provides a hydrogenation function and a chelating agent to give a metal-incorporated support comprising the chelating agent and metal component that is dried and further incorporated with a polar additive to give an additive impregnated composition.

The inventive composition has been found to have exceptional hydrodesulfurization and hydrodenitrogenation activity and to exhibit good catalytic stability when compared to other prior art hydroprocessing catalyst compositions. While it is not known with certainty the actual mechanism that causes or brings about the recognized improvement in catalytic activity of the inventive composition, it is theorized that a combination of the use of the chelating agent with the polar additive provides for the observed catalytic benefits.

When the chelating agent is used with the metal components of the composition it is believed that the chelating agent forms metal chelate complexes with the metals contained in the support and that this reaction results in pulling the metals out or preventing them from being strongly bound to the surface of the support material. When the composition that has been treated with a chelating agent is further filled with the polar additive, it is believed that the metal chelate complexes are dispersed over the surface of the support material. This combined chelation treatment and use of polar additive is believed to provide for enhanced catalytic performance.

The support used in the preparation of the inventive catalyst composition may be any material that can suitably provide for the support of the metal hydrogenation components of the hydroprocessing catalyst and which has porosity that may further be filled with the chelating agent and polar additive of the invention. A porous refractory oxide is typically used as a support material. Examples of possible suitable porous refractory oxides include silica, alumina, titania, zirconia, silica-alumina, silica-titania, silica-zirconia, titania-alumina, zirconia-alumina, silica-titania and combinations of two or more thereof. The preferred porous refractory oxide for use in the preparation of the support of the inventive composition is one selected from the group consisting of alumina, silica, and silica-alumina. Among these, the most preferred porous refractory oxide is alumina.

The porous refractory oxide generally may have an average pore diameter in the range of from about 50 Angstroms to about 200 Angstroms. The total pore volume of the porous refractory oxide as measured by standard mercury porosimetry methods is in the range of from about 0.2 cc/gram to about 2 cc/gram. The surface area of the porous refractory oxide, as measured by the B.E.T. method, generally exceeds about 100 $m^2$/gram, and it is typically in the range of from about 100 to about 400 $m^2$/gram.

The shaped support of the inventive catalyst composition may be prepared by any suitable method known to those skilled in the art. Typically, the porous refractory oxide starting material is in the form of a powder and is mixed with water, and, if desired or necessary, other chemical aids such as peptizing agents or flocculating agents or binders or other compounds, to form a mixture or paste that may be formed into an agglomerate or shaped particle. It can be desirable to extrude the mixture to form extrudates of any one or more of various shapes such as cylinders, trilobes, etc. having nominal sizes such as ¹⁄₁₆ inch, ⅛ inch, ³⁄₁₆ inch, and etc. The agglomerate or shaped particle that comprises one or more of the previously listed inorganic oxide compounds is then dried and calcined to give the final shaped support particle used in the preparation of the inventive catalyst composition.

The shaped support particle is dried under standard drying conditions that can include a drying temperature in the range of from 50° C. to 200° C., preferably, from 75° C. to 175° C., and more preferably, from 90° C. to 150° C.

After drying, the shaped support particle is calcined under standard calcination conditions that include a calcination temperature in the range of from 250° C. to 900° C., preferably, from 300° C. to 800° C., and, most preferably, from 350° C. to 600° C.

The shaped support that has been calcined should have a surface area and pore volume that allow for the impregnation of the shaped support with the metal components, chelating agent and polar additive of the invention. The calcined shaped support can have a surface area (determined by the BET method employing $N_2$, ASTM test method D3037) that is in the range of from 50 $m^2$/g to 450 $m^2$/g, preferably, from 75 $m^2$/g to 400 $m^2$/g, and, most preferably, from 100 $m^2$/g to 350 $m^2$/g.

The mean pore diameter in angstroms (Å) of the calcined shaped support is in the range of from 50 to 200, preferably, from 70 to 150, and, most preferably, from 75 to 125.

The pore volume of the calcined shaped support should exceed 0.55 cc/g and is typically in the range of from 0.5 cc/g to 1.1 cc/g. More typically, the pore volume is in the range of from 0.6 cc/g to 1.0 cc/g, and, most typically, it is from 0.7 to 0.9 cc/g. Less than ten percent (10%) of the total pore volume of the calcined shaped particle is contained in the pores having a pore diameter greater than 350 Å, preferably, less than 7.5% of the total pore volume of the calcined shaped particle is contained in the pores having a pore diameter greater than 350 Å, and, most preferably, less than 5%.

The references herein to pore size distribution and pore volume of the calcined shaped particle are to those properties as determined by mercury intrusion porosimetry, ASTM test method D 4284. The measurement of the pore size distribution of the calcined shaped particle is by any suitable measurement instrument using a contact angle of 140° with a mercury surface tension of 474 dyne/cm at 25° C.

In a preferred embodiment of the invention, the shaped support, which preferably has been calcined, is impregnated with at least one metal component and a chelating agent in a single step impregnation using a single solution containing at least one metal salt, wherein the metal compound of the metal salt solution is an active metal or active metal precursor, and a chelating agent. One of the beneficial features of the invention is that a single step impregnation of the metal component and the chelating agent is used instead of using several steps to separately incorporate the metal components and the chelating agent into the shaped support.

The metal elements of the metal components are those selected from Group 6 of the IUPAC Periodic Table of the elements (e.g., chromium (Cr), molybdenum (Mo), and tungsten (W)) and Groups 9 and 10 of the IUPAC Periodic Table of the Elements (e.g., cobalt (Co) and nickel (Ni)). Phosphorous (P) may also be a desired metal component.

For the Group 9 and 10 metals, the metal salts include Group 9 or 10 metal acetates, formats, citrates, oxides, hydroxides, carbonates, nitrates, sulfates, and two or more thereof. The preferred metal salts are metal nitrates, for example, such as nitrates of nickel or cobalt, or both. For the Group 6 metals, the metal salts include Group 6 metal oxides or sulfides. Preferred are salts containing the Group 6 metal and ammonium ion, such as ammonium heptamolybdate and ammonium dimolybdate.

The concentration of the metal compounds in the impregnation solution is selected so as to provide the desired metal content in the final composition of the invention taking into consideration the pore volume of the support material into which the aqueous solution is to be impregnated and the amounts of chelating agent and polar additive that are to be incorporated into the support material that is loaded with the metal component. Typically, the concentration of metal compound in the impregnation solution is in the range of from 0.01 to 100 moles per liter.

The amount of chelating agent in the impregnation solution is to provide for an amount of chelating agent in the range of from about 0.005 moles chelant to about 1 mole chelant per mole of active metal, i.e., Group 6, Group 9 and Group 10 metals described above, that is in the shaped support. It is more preferred for the impregnation solution to have an amount of chelating agent that is in the range of from 0.01 to 0.5 moles of chelating agent per mole of hydrogenation metal. Most preferred, the amount of chelating agent in the impregnation solution is in the range of from 0.05 to 0.1 moles of added chelant per mole of hydrogenation metal.

The impregnation solution comprising the metal component and chelating agent may further include a solvent that suitably provides for the dissolution of the chelating agent and metal compound. Possible solvents include water and alcohols, such as, methanol and ethanol, with water being the preferred solvent for the chelating agent.

Any suitable means or method can be used in the impregnation of the shaped support with the single solution of chelating agent and metal components; provided, that, such means or method provides for the suitable incorporation or impregnation of the chelating agent and metal component within the pores of the support material. Examples of suitable methods of applying the solution to the shaped support can include dipping or spraying.

A preferred method for contacting the shaped support with the chelant and metal solution is by any suitable impregnation method known to those skilled in the art, for instance, impregnation by incipient wetness whereby the amount or volume of solution added to the shaped support is such that the total volume of the added solution is in an amount that may range upwardly to about the available pore volume of the shaped support to be impregnated with the solution.

The metal content of the shaped support having a metal component incorporated therein along with the chelating agent may depend upon the application for which the final polar additive impregnated composition of the invention is to be used, but, generally, for hydroprocessing applications, the Group 9 and 10 metal component, i.e., cobalt or nickel, preferably, nickel, can be present in the support material in an amount in the range of from 0.5 wt. % to 20 wt. %, preferably from 1 wt. % to 15 wt. %, and, most preferably, from 2 wt. % to 12 wt. %.

The Group 6 metal component, i.e., molybdenum or tungsten, preferably, molybdenum, can be incorporated into the shaped support in an amount in the range of from 5 wt. % to 50 wt. %, preferably from 8 wt. % to 40 wt. %, and, most preferably, from 12 wt. % to 30 wt. %.

The above-referenced weight percents for the metal components are based on the weight of the dry shaped support and the metal component as being the element regardless of the actual form, e.g., the oxide form or sulfide form, of the metal component.

Regardless of the actual means or method used to incorporate the impregnation solution into the shaped support, the pores of the resulting metal-incorporated support will be filled with the impregnation solution and, as a result, are unable to retain or be filled with any additional volume of liquid or other material. The metal-incorporated support, thus, undergoes a drying step by which at least a portion of the volatiles content is driven from the metal-incorporated support but leaving the metals and chelant behind in the support material.

The removal of at least a portion of the volatiles from the metal-incorporated support opens up pore volume which may in a later preparation step be filled with the polar additive. The metal-incorporated support, thus, is dried under drying conditions that include a drying temperature that is less than a calcination temperature.

A significant feature of the invention is for the drying temperature under which the step of drying the metal-incorporated support is conducted not to exceed a calcination temperature. Thus, the drying temperature should not exceed 400° C., and, preferably, the drying temperature at which the metal-incorporated support is dried does not exceed 300° C., and, most preferably, the drying temperature does not exceed 250° C. It is understood that this drying step will, in general, be conducted at lower temperatures than the aforementioned temperatures, and, typically, the drying temperature will be conducted at a temperature in the range of from 60° C. to 150° C.

The drying of the metal-incorporated support is preferably controlled in a manner so as to provide the resulting dried metal-incorporated support that has a volatiles content in a particular range. The volatiles content of the dried metal-incorporated support should be controlled so that it does not exceed 20 wt. % LOI. It is preferred for the LOI of the dried metal-incorporated support to be in the range of from 1 wt. % to 20 wt. % LOI, and, most preferred, from 3 wt. % to 15 wt. % LOI.

LOI, or loss on ignition, is defined as the percentage weight loss of the material after its exposure to air at a temperature of 482° C. for a period of two hours. LOI can be represented by the following formula: (sample weight before exposure less sample weight after exposure) multiplied by 100 and divided by (sample weight before exposure).

In the drying of the metal-incorporated support it is desirable to remove as little of the chelant therefrom as is practical and, thus, more than about 50 weight percent of the chelant that is incorporated into the metal-incorporated support, based on the total weight of chelant incorporated into the metal-incorporated support, will remain in the resulting dried metal-incorporated support. Preferably, the amount of chelant remaining on the dried metal-incorporated support exceeds 75 weight percent, and, most preferably, more than 90 weight percent of the chelant originally added to the dried metal-incorporated support remains in the dried metal-incorporated support when the polar additive is subsequently added. Thus, less than about 50 weight percent of the chelant originally added to the dried metal-incorporated support in the chelation treatment thereof should be removed from the metal-incorporated support during the drying step. Preferably, less than 25 weight percent and, most preferably, less than 10 weight percent, of the chelant incorporated into the dried metal-incorporated support is removed from the metal-incorporated support.

The chelating agent, or chelant, suitable for use in the inventive method includes those compounds that are capable of forming complexes with the metal components, such as any of the Group 6 metals, Group 9 metals and Group 10 metals, as described above, of the composition. As earlier noted, it is particularly important to the inventive method that the chelant have properties which provide for the formation of chelate complexes with the metals of the composition in order to pull the metals from the surface of its support material. The terms chelant, chelating agent, and chelator are used herein to mean the same thing and are considered to be compound that functions as a ligand to form a chelate or chelate complex with a central metal ion.

Any chelant compound that suitably provides for the formation of metal chelant complexes as required by the inventive method described herein can be used in the chelating treatment. Among these chelant compounds are those chelating agents that contain at least one nitrogen atom that can serve as the electron donor atom for forming the complexes with the metals of the dried metal-incorporated support.

Examples of possible nitrogen atom containing chelating agents include those compounds that can be classified as aminocarboxylic acids, polyamines, aminoalcohols, oximes, and polyethyleneimines.

Examples of aminocarboxylic acids include ethylenediaminetetraacetic acid (EDTA), hydroxyethylenediaminetriacetic acid (HEDTA), diethylenetriaminepentaacetic acid (DTPA), and nitrilotriacetic acid (NTA).

Examples of polyamines include ethylenediamine, diethylenetriamine, triethylenetetramine, and triaminotriethylamine.

Examples of aminoalcohols include triethanolamine (TEA) and N-hydroxyethylethylenediamine.

The preferred chelating agent for use in the inventive method is an aminocarboxylic acid that can be represented by the following formula:

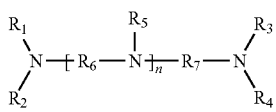

Wherein $R_1$, $R_2$, $R_3$, $R_4$ and $R_5$ are each independently selected from alkyl, alkenyl, and allyl with up to 10 carbon atoms and which may be substituted with one or more groups selected from carbonyl, carboxyl, ester, ether, amino, or amide; wherein R6 and R7 are each independently selected from an alkylene group with up to 10 carbon atoms; wherein n is either 0 or 1; and wherein one or more of the $R_1$, $R_2$, $R_3$, $R_4$ and $R_5$ has the formula:

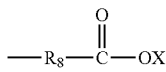

Wherein, $R_8$ is an alkylene having from 1 to 4 carbon atoms; and wherein the X is either hydrogen or another cation.

Preferred chelating agents include ethylenediaminetetraacetic acid (EDTA), hydroxyethylenediaminetriacetic acid (HEDTA), and diethylenetriaminepentaacetic acid (DTPA). The most preferred chelating agent is DTPA.

The available pore volume of the pores of the dried metal-incorporated support provided by drying of the metal-incorporated support may be filled with the polar additive of the invention. This is done by incorporating the polar additive into the dried metal-incorporated support to provide an additive impregnated composition by using any suitable method or means to impregnate the dried metal-incorporated support with the polar additive.

The preferred method of impregnation of the dried metal-incorporated support with the polar additive may be any standard well-known pore fill methodology whereby the pore volume is filled by taking advantage of capillary action to draw the liquid into the pores of the dried chelant treated metal-incorporated support. It is desirable to fill at least 75% of the available pore volume of the dried metal-incorporated support with the polar additive, and, preferably, at least 80% of the available pore volume of the dried metal-incorporated support is filled with the polar additive. Most preferably, at least 90% of the available pore volume of the dried metal-incorporated support is filled with the polar additive.

In addition to the dispersing of metal complexes by the polar additive, it is also thought that the presence of the polar additive in the additive impregnated composition, when it is placed in catalytic service or when it undergoes an activation in order to use the composition in catalytic service, provides certain benefits that help give a much more active catalyst than those of the prior art.

The polar additive that may be used in the preparation of the inventive composition can be any suitable molecule that provides for the benefits and has the characteristic molecular polarity or molecular dipole moment and other properties, if applicable, as are described herein, and as are disclosed in co-pending patent application U.S. application Ser. No. 12/407,479, filed Mar. 19, 2009, (U.S. Publication No. US20100236988), which is incorporated herein by reference. Molecular polarity is understood in the art to be a result of non-uniform distribution of positive and negative charges of the atoms that make up a molecule. The dipole moment of a molecule may be approximated as the vector sum of the individual bond dipole moments, and it can be a calculated value.

One method of obtaining a calculated value for the dipole moment of a molecule, in general, includes determining by calculation the total electron density of the lowest energy conformation of the molecule by applying and using gradient corrected density functional theory. From the total electron density the corresponding electrostatic potential is derived and point charges are fitted to the corresponding nuclei. With the atomic positions and electrostatic point charges known, the molecular dipole moment can be calculated from a summation of the individual atomic moments.

As the term is used in this description and in the claims, the "dipole moment" of a given molecule is that as determined by calculation using the publicly available, under license, computer software program named Materials Studio, Revision 4.3.1, copyright 2008, Accerlys Software Inc.

Following below is a brief discussion of some of the technical principles behind the computation method and application of the Materials Studio computer software program for calculating molecular dipole moments.

The first step in the determination of the calculated value of the dipole moment of a molecule using the Materials Studio software involves constructing a molecular representation of the compound using the sketching tools within the visualizer module of Materials Studio. This sketching process involves adding atoms to the sketcher window that constitute the compound and completing the bonds between these atoms to fulfill the recognized bonding connectivity that constitute the compound. Using the clean icon within the Material Studio program automatically orients the constructed compound into the correct orientation. For complex compounds, a conformational search is performed to ensure that the orientation used to calculate the molecular dipole is the lowest energy conformation, i.e., its natural state.

The quantum mechanical code DMol3 (Delley, B. *J. Chem. Phys.*, 92, 508 (1990)) is utilized to calculate the molecular dipole moments from first principles by applying density functional theory. Density functional theory begins with a theorem by Hohenberg and Kohn (Hohenberg, P. et al., "Inhomogeneous Electron Gas", *Phys. Rev. B*, 136, 864-871 (1964); Levy, M., "Universal Variational Functionals of Electron Densities, First-Order Density Matrices, and Natural Spin-Orbitals and Solution of the V-Representability Problem", *Proc. Natl. Acad. Sci. U.S.A*, 76, 6062-6065 (1979)), which states that all ground-state properties are functions of the charge density ρ. Specifically, the total energy $E_t$ may be written as:

$$E_t[\rho]=T[\rho]+U[\rho]+E_{xc}[\rho] \qquad \text{Eq. 1}$$

where T [ρ] is the kinetic energy of a system of noninteracting particles of density ρ, U [ρ] is the classical electrostatic energy due to Coulombic interactions, and $E_{xc}$ [ρ] includes all many-body contributions to the total energy, in particular the exchange and correlation energies.

As in other molecular orbital methods (Roothaan, C. C. J., "New Developments in Molecular Orbital Theory", *Rev. Mod. Phys.*, 23, 69-89 (1951); Slater, J. C., "Statistical Exchange-Correlation in the Self-Consistent Field", *Adv. Quantum Chem.*, 6, 1-92 (1972); Dewar, M. J. S. *J. Mol. Struct.*, 100, 41 (1983)), the wavefunction is taken to be an antisymmetrized product (Slater determinant) of one-particle functions, that is, molecular orbitals:

$$\Psi = A(n) |\phi_1(1)\phi_2(2) \ldots \phi_n(n)| \qquad \text{Eq. 2}$$

The molecular orbitals also must be orthonormal:

$$\langle \phi_i | \phi_j \rangle = \delta_{ij} \qquad \text{Eq. 3}$$

The charge density summed over all molecular orbitals is given by the simple sum:

$$\rho(r) = \sum_i |\phi_i(r)|^2 \qquad \text{Eq. 4}$$

where the sum goes over all occupied molecular orbitals $\phi_i$. The density obtained from this expression is also known as the charge density. From the wavefunctions and the charge density the energy components from Eq. 1 can be written (in atomic units) as:

$$T = \left\langle \sum_i^n \phi_i \left| \frac{-\nabla^2}{2} \right| \phi_i \right\rangle \qquad \text{Eq. 5}$$

In Eq. 6, $Z\alpha$ refers to the charge on nucleus $\alpha$ of an N-atom system. Further, in Eq. 6, the term $\rho(r_1)V_N$, represents the electron-nucleus attraction, the term $\rho(r_1)V_e(r_1)/2$, represents the electron-electron repulsion, and the term, $V_{NN}$, represents the nucleus-nucleus repulsion.

$$U = \sum_i^n \sum_\alpha^N \left\langle \phi_i(r) \left| \frac{-Z}{R_\alpha - r} \right| \phi_i(r) \right\rangle +$$

$$\frac{1}{2} \sum_i \sum_j \left\langle \phi_i(r_1)\phi_j(r_2) \frac{1}{r_1 - r_2} \phi_i(r_1)\phi_j(r_2) \right\rangle +$$

$$\sum_\alpha^N \sum_{\beta < \alpha} \frac{Z_\alpha Z_\beta}{|R_\alpha - R_\beta|}$$

$$= -\sum_\alpha^N \left\langle \rho(r_1) \frac{Z_\alpha}{|R_\alpha - r_1|} \right\rangle + \frac{1}{2} \left\langle \rho(r_1)\rho(r_2) \frac{1}{|r_1 - r_2|} \right\rangle +$$

$$\sum_\alpha^N \sum_{\beta < \alpha} \frac{Z_\alpha Z_\beta}{|R_\alpha - R_\beta|}$$

$$\equiv \langle -\rho(r_1)V_N \rangle + \left\langle \rho(r_1) \frac{V_e(r_1)}{2} \right\rangle + V_{NN}$$

Eq. 6

The term, $E_{xc}[\rho]$ in Eq. 1, the exchange-correlation energy, requires some approximation for this method to be computationally tractable. A simple and surprisingly good approximation is the local density approximation, which is based on the known exchange-correlation energy of the uniform electron gas. (Hedin, L.; Lundqvist, B. I. "Explicit local exchange correlation potentials", *J. Phys. C*, 4, 2064-2083 (1971); Ceperley, D. M.; Alder, B. J. "Ground state of the electron gas by a stochastic method", *Phys. Rev. Lett.*, 45, 566-569 (1980)). The local density approximation assumes that the charge density varies slowly on an atomic scale (i.e., each region of a molecule actually looks like a uniform electron gas). The total exchange-correlation energy can be obtained by integrating the uniform electron gas result:

$$\varepsilon_{xc}[\rho] \cong \int \rho(r)\varepsilon_{xc}[\rho(r)]dr \qquad \text{Eq. 7}$$

where $E_{xc}[\rho]$ is the exchange-correlation energy per particle in a uniform electron gas and $\rho$ is the number of particles. In this work the gradient corrected exchange-correlation functional PW91 is used (Perdew, J. P.; Wang, Y. *Phys. Rev. B*, 45, 13244 (1992)).

With all the components derived to describe the total energy of any molecular system within the density functional formalism, the dipole moment can be calculated from a summation of the individual electronic and nuclear dipole moment vectors which are displayed at the end of the DMol3 output file.

References herein to the polar additive are understood to mean a molecule that has polarity and having a dipole moment, as calculated by the aforementioned Materials Studio software or other known method that will provide substantially the same calculated value for the dipole moment of a molecule as the Materials Studio software will provide, which exceeds the dipole moment of the hydrocarbon oil that is used in the inventive composition.

The dipole moment of the polar additive should be at least or exceed 0.45. However, it is preferred for the polar additive to have a characteristic dipole moment that is at least or exceeds 0.5, and, more preferred, the dipole moment of the polar additive should be at least or exceed 0.6. A typical upper limit to the dipole moment of the polar additive is up to about 5, and, thus, the dipole moment of the polar additive may be, for example, in the range of from 0.45 to 5. It is preferred for the dipole moment of the polar additive to be in the range of from 0.5 to 4.5, and, more preferred, the dipole moment is to be in the range of from 0.6 to 4.

As alluded to above, it is theorized that the polarity of the polar additive is significant to the invention; because, the polarity is required for the interaction with the surface of the support material and active metal components of the support material of the inventive composition. It is by these interactions that physical and chemical bonds with the active phases of the inventive composition are formed.

A particularly desirable attribute of the polar additive is for it to be a heterocompound. A heterocompound is considered herein to be a molecule that includes atoms in addition to carbon and hydrogen. These additional atoms can include, for example, nitrogen or oxygen, or both. It is desirable for the group of hetercompounds to exclude those heterocompounds that include sulfur, and, in all cases, the polar additive does not include paraffin and olefin compounds, i.e. compounds that contain only carbon and hydrogen atoms. Considering the exclusion of sulfur-containing compounds from the definition of the group of heterocompounds, it can further be desirable for the oil and additive impregnated composition, before its treatment with hydrogen and sulfur, to exclude the material presence of a sulfur-containing compound.

Specific polar compounds that may be suitable for use as the polar additive of the invention are presented in the following Table 1, which also includes their calculated dipole moments.

TABLE 1

Polar Compounds and Their Calculated Dipole Moments

| Compound | Formula | Class | Boiling Point (° C.) | Calc. Dipole Moment |
|---|---|---|---|---|
| 2, 4-pentanedione | $C_5H_8O_2$ | Diketone | 140 | 1.59 |
| Triethylphosphate | $C_6H_{15}O_4P$ | Phosphate | 215-216 | 3.25 |
| Triethylphosphite | $C_6H_{15}O_3P$ | Phosphite | 156 | 0.64 |
| 1-pentanol | $C_5H_{12}O$ | Alcohol | 138 | 1.85 |
| Guanidine | $CH_5N_3$ | Imine | n/a | 3.8 |
| Alanine | $C_3H_7NO_2$ | Amino acid | n/a | 2.16 |
| Glycine | $C_2H_5NO_2$ | Amino acid | n/a | 5.81 |
| Ethylenediamine | $C_2H_8N_2$ | Diamine | 116 | 2.46 |
| Monoethanolamine | $C_2H_7NO$ | Alcohol-amine | 170 | 3.42 |
| Tetramethylurea | $C_5H_{12}N_2O$ | Diamine | 174-178 | 3.44 |
| Acetonitrile | $C_2H_3N$ | Nitrile | 82 | 3.87 |
| n-methylpyrrolidone | $C_5H_9NO$ | Cyclic-amide | 202 | 3.92 |
| glucose | $C_6H_{12}O_6$ | sugar | n/a | 4.38 |
| Sucrose | $C_{12}H_{22}O_{11}$ | sugar | n/a | 7.45 |
| Octylamine | $C_8H_{19}N$ | Amine | 175-176 | 1.36 |
| Phenylboromic acid | $C_6H_7BO_2$ | Boric acid | n/a | 5.86 |
| n-etylcarbazole | $C_{14}H_{13}N$ | Carbazole | n/a | 1.93 |
| Acetophenone | $C_8H_8O$ | ketone | 202 | 3.15 |
| Diethyleneglycol | $C_4H_{10}O_3$ | Alcohol | 244-245 | 2.76 |
| Dibenzofuran | $C_{12}H_8O$ | Oxygen heterocycle | 285 | 0.78 |
| Dimethylformamide | $C_3H_7NO$ | Amide | 153 | 4.02 |
| Citric acid | $C_6H_8O_7$ | Carboxylic Acid | 175 | 3.37 |
| Ethylenediaminetetraacetic acid | $C_{10}H_{16}N_2O_8$ | Polyamino carboxylic acid | n/a | 3.99 |
| Nitriltriacetic acid | $C_6H_9NO_6$ | Polyamino carboxylic acid | n/a | 1.58 |

A preferred characteristic of the polar additive is for its boiling temperature to be in the range of from 50° C. to 275° C. More preferably, the boiling temperature of the polar additive is to be in the range of from 60° C. to 250° C., and, most preferably, it is in the range of from 80° C. to 225° C.

The most desirable compounds for use as the polar additive of the invention are those selected from the group of amide compounds, which includes dimethylformamide.

The additive impregnated composition of the invention may be treated, either ex situ or in situ, with hydrogen and with a sulfur compound, and, indeed, it is one of the beneficial features of the invention that it permits the shipping and delivery of a non-sulfurized composition to a reactor in which it can be activated, in situ, by a hydrogen treatment step followed by a sulfurization step. In the activation of the additive impregnated composition it first can undergo a hydrogen treatment that is then followed with treatment with a sulfur compound.

The hydrogen treatment includes exposing the additive impregnated composition to a gaseous atmosphere containing hydrogen at a temperature ranging upwardly to 250° C. Preferably, the additive impregnated composition is exposed to the hydrogen gas at a hydrogen treatment temperature in the range of from 100° C. to 225° C., and, most preferably, the hydrogen treatment temperature is in the range of from 125° C. to 200° C.

The partial pressure of the hydrogen of the gaseous atmosphere used in the hydrogen treatment step generally can be in the range of from 1 bar to 70 bar, preferably, from 1.5 bar to 55 bar, and, most preferably, from 2 bar to 35 bar. The additive impregnated composition is contacted with the gaseous atmosphere at the aforementioned temperature and pressure conditions for a hydrogen treatment time period in the range of from 0.1 hours to 100 hours, and, preferably, the hydrogen treatment time period is from 1 hour to 50 hours, and most preferably, from 2 hours to 30 hours.

Sulfiding of the additive impregnated composition after it has been treated with hydrogen can be done using any conventional method known to those skilled in the art. Thus, the hydrogen treated additive impregnated composition can be contacted with a sulfur-containing compound, which can be hydrogen sulfide or a compound that is decomposable into hydrogen sulfide, under the contacting conditions of the invention. Examples of such decomposable compounds include mercaptans, $CS_2$, thiophenes, dimethyl sulfide (DMS), and dimethyl disulfide (DMDS). Also, preferably, the sulfiding is accomplished by contacting the hydrogen treated composition, under suitable sulfurization treatment conditions, with a hydrocarbon feedstock that contains a concentration of a sulfur compound. The sulfur compound of the hydrocarbon feedstock can be an organic sulfur compound, particularly, one which is typically contained in petroleum distillates that are processed by hydrodesulfurization methods.

Suitable sulfurization treatment conditions are those which provide for the conversion of the active metal components of the hydrogen treated hydrocarbon oil and polar additive impregnated composition to their sulfided form. Typically, the sulfiding temperature at which the hydrogen treated hydrocarbon oil and polar additive impregnated composition is contacted with the sulfur compound is in the range of from 150° C. to 450° C., preferably, from 175° C. to 425° C., and, most preferably, from 200° C. to 400° C.

When using a hydrocarbon feedstock that is to be hydrotreated using the catalyst composition of the invention to sulfide the hydrogen treated composition, the sulfurization conditions can be the same as the process conditions under which the hydrotreating is performed. The sulfiding pressure at which the hydrogen treated additive impregnated composition is sulfided generally can be in the range of from 1 bar to 70 bar, preferably, from 1.5 bar to 55 bar, and, most preferably, from 2 bar to 35 bar.

One of the benefits provided by the additive impregnated composition of the invention is that it can be utilized in a reactor system that is started up using a so-called delayed feed introduction procedure. In the delayed feed introduction procedure, the reactor system, which includes a reactor vessel containing the additive impregnated composition, first undergoes a heating step to raise the temperature of the reactor and the additive impregnated composition contained therein in preparation for the introduction of a sulfiding agent or heated hydrocarbon feedstock for processing. This heating step includes introducing into the reactor the hydrogen-containing gas at the aforementioned hydrogen treatment conditions. After the hydrogen treatment of the additive impregnated composition, it is thereafter treated with a sulfur compound in the manner as earlier described herein.

It has been found that the additive impregnated composition, after undergoing the hydrogen treatment followed by treatment with a sulfur compound, exhibits a greater catalytic hydrotreating activity of a distillate feedstock than do other similar, but non-impregnated compositions.

It is recognized that the additive impregnated composition of the invention, after its treatment with hydrogen and sulfur, is a highly effective catalyst for use in the hydrotreating of hydrocarbon feedstocks. This catalyst is particularly useful in applications involving the hydrodesulfurization or hydrodenitrogenation of hydrocarbon feedstocks, and, especially, it has been found to be an excellent catalyst for use in the hydrodesulfurization of distillate feedstocks, in particular, diesel, to make an ultra-low sulfur distillate product having a sulfur concentration of less than 15 ppmw, preferably, less than 10 ppmw, and, most preferably, less than 8 ppmw.

In the hydrotreating applications, the additive impregnated composition, preferably used in a delayed feed introduction procedure or otherwise treated with hydrogen and sulfur, as described above, is contacted under suitable hydrodesulfurization conditions with a hydrocarbon feedstock that typically has a concentration of sulfur. The more typical and preferred hydrocarbon feedstock is a petroleum middle distillate cut having a boiling temperature at atmospheric pressure in the range of from 140° C. to 410° C. These temperatures are approximate initial and boiling temperatures of the middle distillate. Examples of refinery streams intended to be included within the meaning of middle distillate include straight run distillate fuels boiling in the referenced boiling range, such as, kerosene, jet fuel, light diesel oil, heating oil, heavy diesel oil, and the cracked distillates, such as FCC cycle oil, coker gas oil, and hydrocracker distillates. The preferred feedstock of the inventive distillate hydrodesulfurization process is a middle distillate boiling in the diesel boiling range of from about 140° C. to 400° C.

The sulfur concentration of the middle distillate feedstock can be a high concentration, for instance, being in the range upwardly to about 2 weight percent of the distillate feedstock based on the weight of elemental sulfur and the total weight of the distillate feedstock inclusive of the sulfur compounds. Typically, however, the distillate feedstock of the inventive process has a sulfur concentration in the range of from 0.01 wt. % (100 ppmw) to 1.8 wt. % (18,000). But, more typically, the sulfur concentration is in the range of from 0.1 wt. % (1000 ppmw) to 1.6 wt. % (16,000 ppmw), and, most typically, from 0.18 wt. % (1800 ppmw) to 1.1 wt. % (11,000 ppmw). It is understood that the references herein to the sulfur content of the distillate feedstock are to those compounds that are normally found in a distillate feedstock or in the hydrodesulfurized distillate product and are chemical compounds that contain a sulfur atom and which generally include organosulfur compounds.

The additive impregnated composition of the invention may be employed as a part of any suitable reactor system that provides for contacting it or its derivatives with the distillate feedstock under suitable hydrodesulfurization conditions that may include the presence of hydrogen and an elevated total pressure and temperature. Such suitable reaction systems can include fixed catalyst bed systems, ebullating catalyst bed systems, slurried catalyst systems, and fluidized catalyst bed systems. The preferred reactor system is that which includes a fixed bed of the inventive catalyst contained within a reactor vessel equipped with a reactor feed inlet means, such as a feed nozzle, for introducing the distillate feedstock into the reactor vessel, and a reactor effluent outlet means, such as an effluent outlet nozzle, for withdrawing the reactor effluent or the treated hydrocarbon product or the ultra-low sulfur distillate product from the reactor vessel.

The hydrodesulfurization process generally operates at a hydrodesulfurization reaction pressure in the range of from 689.5 kPa (100 psig) to 13,789 kPa (2000 psig), preferably from 1896 kPa (275 psig) to 10,342 kPa (1500 psig), and, more preferably, from 2068.5 kPa (300 psig) to 8619 kPa (1250 psig).

The hydrodesulfurization reaction temperature is generally in the range of from 200° C. (392° F.) to 420° C. (788° F.), preferably, from 260° C. (500° F.) to 400° C. (752° F.), and, most preferably, from 320° C. (608° F.) to 380° C. (716° F.). It is recognized that one of the unexpected features of the use of the inventive additive impregnated composition of the invention is that it has a significantly higher catalytic activity than certain other alternative catalyst compositions, and, thus, it will, in general, provide for comparatively lower required process temperatures for a given amount of hydtrotreatment of a feedstock.

The flow rate at which the distillate feedstock is charged to the reaction zone of the inventive process is generally such as to provide a liquid hourly space velocity (LHSV) in the range of from 0.01 $hr^{-1}$ to 10 $hr^{-1}$. The term "liquid hourly space velocity", as used herein, means the numerical ratio of the rate at which the distillate feedstock is charged to the reaction zone of the inventive process in volume per hour divided by the volume of catalyst contained in the reaction zone to which the distillate feedstock is charged. The preferred LHSV is in the range of from 0.05 $hr^{-1}$ to 5 $hr^{-1}$, more preferably, from 0.1 $hr^{-1}$ to 3 $hr^{-1}$, and, most preferably, from 0.2 $hr^{-1}$ to 2 $hr^{-1}$.

It is preferred to charge hydrogen along with the distillate feedstock to the reaction zone of the inventive process. In this instance, the hydrogen is sometimes referred to as hydrogen treat gas. The hydrogen treat gas rate is the amount of hydrogen relative to the amount of distillate feedstock charged to the reaction zone and generally is in the range upwardly to 1781 $m^3/m^3$ (10,000 SCF/bbl). It is preferred for the treat gas rate to be in the range of from 89 $m^3/m^3$ (500 SCF/bbl) to 1781 $m^3/m^3$ (10,000 SCF/bbl), more preferably, from 178 $m^3/m^3$ (1,000 SCF/bbl) to 1602 $m^3/m^3$ (9,000 SCF/bbl), and, most preferably, from 356 $m^3/m^3$ (2,000 SCF/bbl) to 1425 $m^3/m^3$ (8,000 SCF/bbl).

The desulfurized distillate product yielded from the process of the invention has a low or reduced sulfur concentration relative to the distillate feedstock. A particularly advantageous aspect of the inventive process is that it is capable of providing a deeply desulfurized diesel product or an ultra-low sulfur diesel product. As already noted herein, the low sulfur distillate product can have a sulfur concentration that is less than 50 ppmw or any of the other noted sulfur concentrations as described elsewhere herein (e.g., less than 15 ppmw, or less than 10 ppmw, or less than 8 ppmw).

What is claimed is:

1. A hydroprocessing catalyst composition, comprising:
a dried metal-incorporated support, and
an incorporated polar additive;
wherein said dried metal-incorporated support comprises a dried and calcined shaped support particle, having incorporated therein a metal component and a chelating agent selected from the group of compounds consisting of aminocarboxylic acids, polyamines, aminoalcohols, oximes, and polyethyleneimines, which has been dried thereby providing said dried metal-incorporated support;
wherein said incorporated polar additive is selected from the group of amide compounds having a polarity and a dipole moment of at least 0.45, and
wherein at least 75% of the available pore volume of said dried metal-incorporated support is filled with said polar additive.

2. A hydroprocessing catalyst composition as recited in claim 1, wherein said hydroprocessing catalyst composition comprises a Group 9 or Group 10 metal component selected from the group consisting of cobalt and nickel present in an amount in the range of from 0.5 wt. % to 20 wt. %, and a Group 6 metal component selected from the group consisting of molybdenum and tungsten present in an amount in the range of from 5 wt. % to 50 wt. %, wherein the weight percents are based on the weight of the dry support material with the metal component as the element regardless of its actual form.

3. A hydroprocessing catalyst composition as recited in claim 2, wherein said calcined shaped support particles comprise a porous refractory oxide selected from the group of refractory oxides consisting of silica, alumina, titania, zirconia, silica-alumina, silica-titania, silica-zirconia, titania-alumina, zirconia-alumina, silica-titania and combinations of two or more thereof; and wherein said calcined shaped support particles have a surface area (as determined by the BET method) in the range of from 50 $m^2$/g to 450 $m^2$/g, a mean pore diameter in the range of from 50 to 200 angstroms (Å), and a total pore volume exceeding 0.55 cc/g.

4. A hydroprocessing process, comprising: contacting under hydroprocessing reaction conditions the composition of claim 3 with a hydrocarbon feedstock.

5. A hydroprocessing process, comprising: contacting under hydroprocessing reaction conditions the composition of claim 2 with a hydrocarbon feedstock.

6. A hydroprocessing process, comprising: contacting under hydroprocessing reaction conditions the composition of claim 1 with a hydrocarbon feedstock.

* * * * *